United States Patent
Watanabe et al.

(10) Patent No.: US 6,370,929 B1
(45) Date of Patent: Apr. 16, 2002

(54) APPARATUS FOR INSERTION OF A KEY THEREIN

(75) Inventors: Yoshitaka Watanabe; Shoichi Harada; Keiji Yamamoto, all of Aichi-ken (JP)

(73) Assignee: Kabushiki Kaisha Tokai-Rika-Denki Seisakusho, Aichi-ken (JP)

(*) Notice: Subject to any disclaimer, the term of this patent is extended or adjusted under 35 U.S.C. 154(b) by 0 days.

(21) Appl. No.: 09/478,011

(22) Filed: Jan. 5, 2000

(30) Foreign Application Priority Data

Jan. 11, 1999 (JP) ............................................ 11-004236

(51) Int. Cl.⁷ ......................... E05B 13/02; E05B 17/14
(52) U.S. Cl. ............................. 70/423; 70/427; 70/454; 70/DIG. 51
(58) Field of Search .................. 70/388, 414, 423–428, 70/454–455, DIG. 51

(56) References Cited

U.S. PATENT DOCUMENTS

| | | | |
|---|---|---|---|
| 1,929,741 A | 10/1933 | Hall et al. ....................... | 70/14 |
| 1,997,528 A | 4/1935 | Lovatt ............................ | 70/14 |
| 2,932,186 A | 4/1960 | Mahrley ....................... | 70/455 |
| 3,320,782 A * | 5/1967 | Turman ........................ | 70/388 |
| 3,661,000 A * | 5/1972 | Kerr ............................. | 70/388 |
| 4,022,039 A * | 5/1977 | Mikos .......................... | 70/388 |
| 4,423,611 A * | 1/1984 | Neyret et al. ................. | 70/455 |
| 4,449,126 A * | 5/1984 | Pekker ................... | 340/825.32 |
| 4,985,693 A * | 1/1991 | Sumani ....................... | 340/426 |
| 5,043,593 A * | 8/1991 | Tsutsumi et al. ........... | 307/10.2 |
| 5,410,898 A * | 5/1995 | Shieh ........................... | 70/276 |
| 5,552,587 A * | 9/1996 | Moorhouse ................. | 235/382 |
| 5,729,057 A | 3/1998 | Frenzel et al. ............. | 307/10.3 |
| 5,996,383 A * | 12/1999 | Adelmeyer et al. ........... | 70/454 |

FOREIGN PATENT DOCUMENTS

| | | |
|---|---|---|
| EP | 0 497 661 A1 | 8/1982 |
| EP | 0 348 617 A1 | 1/1990 |
| EP | 0 741 220 A2 | 1/1996 |

* cited by examiner

Primary Examiner—Lynne H. Browne
Assistant Examiner—John B. Walsh
(74) Attorney, Agent, or Firm—Knobbe, Martens, Olson & Bear, LLP

(57) ABSTRACT

An apparatus for insertion of a key therein substantially prevents foreign matter from entering into a key insertion hole, and even if foreign matter does enter into the key insertion hole, discharges the foreign matter therefrom. A shutter is provided within the key insertion hole so as to be movable along a direction of insertion of a key. The shutter is always urged by a compression coil spring toward an opening of the insertion hole. In a state in which no key is inserted in the insertion hole, the shutter is urged by the compression coil spring and closes the insertion hole. As a result, foreign matter such as dust or the like can be prevented from entering into the insertion hole. Further, the shutter is provided with a reflecting surface, and when no key is inserted in the insertion hole, the reflecting surface reflects light from a light source so as to illuminate the opening of the insertion hole. Thus, even if a region surrounding the opening of the insertion hole is dark, the opening can be visually confirmed and the key can be easily inserted into the insertion hole.

18 Claims, 6 Drawing Sheets

APPARATUS FOR INSERTION OF A KEY THEREIN

BACKGROUND OF THE INVENTION

1. Field of the Invention

The present invention relates to an apparatus for insertion of a key therein.

2. Description of the Related Art

In general key devices for vehicles, a door-like shutter is provided at the opening of a key insertion hole. In this way, foreign matter such as dust or the like can be prevented from entering into the insertion hole.

However, in such key devices for vehicles, foreign matter such as dust can usually be prevented from entering into the key insertion hole, but if foreign matter such as dust does enter into the insertion hole, it cannot be discharged therefrom.

SUMMARY OF THE INVENTION

In view of the aforementioned, an object of the present invention is to provide an apparatus for insertion of a key therein which can substantially prevent foreign matter such as dust from entering into the key insertion hole, and, even if foreign matter does enter into the insertion hole, allows the foreign matter to be discharged therefrom.

A first aspect of the invention is an apparatus for insertion of a key therein, the apparatus comprising: a body portion having an insertion hole defined therein for insertion of a key into the insertion hole, the insertion hole having an opening side; a shutter disposed so as to be movable within the insertion hole, along a direction of insertion of the key into the insertion hole, between a closing position, wherein the shutter is positioned proximate the opening side of the insertion hole, and an operation position, wherein the shutter has been pushed by the key and moved further into the insertion hole when the key has been inserted, the shutter substantially closing the insertion hole when at the closing position; and a biasing member which biases the shutter toward the closing position.

In the apparatus for insertion of a key therein of the first aspect, a shutter, which is movable along the direction in which the key is inserted into the insertion hole, is provided in the insertion hole.

In accordance with this aspect, because the biasing member always urges the shutter toward the opening side of the insertion hole, in a state in which no key is inserted into the insertion hole, the shutter is positioned at the opening side of the insertion hole and closes the insertion hole. As a result, foreign matter such as dust or the like can be reliably prevented from entering into the insertion hole.

When a key is inserted into the insertion hole, the shutter is abutted by and pushed by the key, and moves further into the insertion hole against the biasing force of the biasing member. Further, when the key is removed from the insertion hole, the shutter is moved to the opening side of the insertion hole by the biasing force of the biasing member. Therefore, even if foreign matter such as dust or the like does enter into the insertion hole while the key is being inserted therein, the foreign matter can be discharged to the exterior of the insertion hole by the shutter when the key is removed from the insertion hole.

Namely, foreign matter such as dust or the like can be substantially prevented from entering into the key insertion hole, and even in a case in which foreign matter does enter into the insertion hole, the foreign matter can be reliably discharged therefrom.

In a second aspect of the present invention, the shutter of the apparatus for insertion of a key therein of the first aspect is formed by a transparent member, and guides light from a light source toward the opening of the insertion hole.

In accordance with the second aspect, because the shutter is formed by a transparent member and guides light from the light source to the opening of the insertion hole, the shutter also functions as a light guide and enables illumination of the insertion hole opening. Therefore, even when the region surrounding the opening of the insertion hole is dark (such as at night), the opening of the insertion hole can be confirmed visually. Accordingly, the key can easily be inserted into the insertion hole. Further, because the opening of the insertion hole can be illuminated, the direction of the knob (the direction of inclination of the knob) can be confirmed visually.

In a third aspect of the present invention, in the apparatus for insertion of a key therein of the second aspect, the shutter has a reflecting surface which, when the shutter is positioned at the opening side of the insertion hole, opposes the light source and reflects light from the light source toward the opening of the insertion hole.

In the third aspect, the shutter is provided with a reflective surface. The position and angle of inclination of the reflective surface can be set in accordance with the position at which the light source is set. As a result, in accordance with the third aspect, the range of applications of the present structure can be broadened, and manufacturers have more degrees of freedom in designing the structure.

DESCRIPTION OF THE PREFERRED EMBODIMENTS

Figure 1:
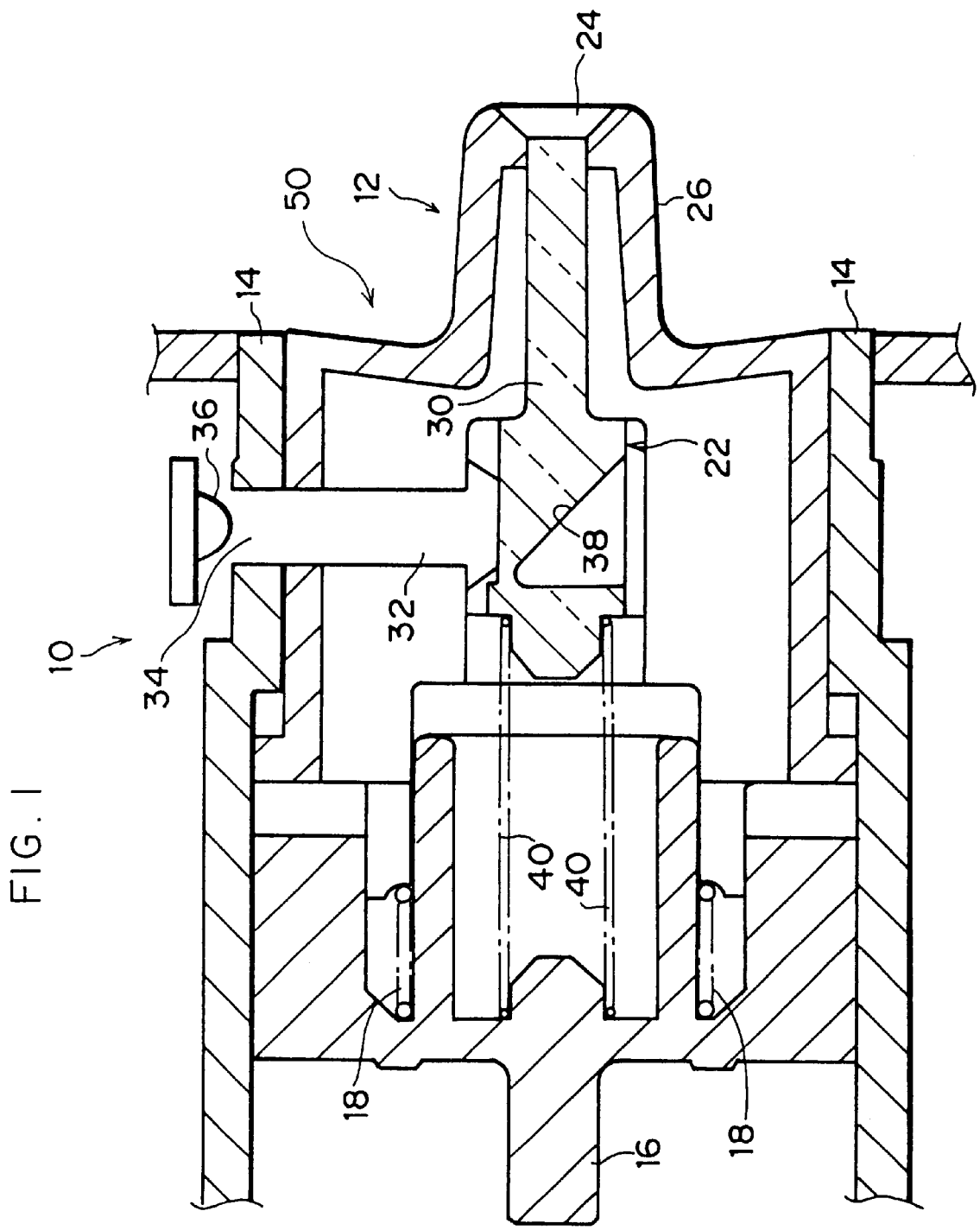
FIG. 1 is a cross-sectional view (taken along line 1—1 of FIG. 3) of a schematic structure of a key device for a vehicle to which the apparatus for insertion of a key therein of a preferred embodiment of the present invention is applied.
Figure 2:
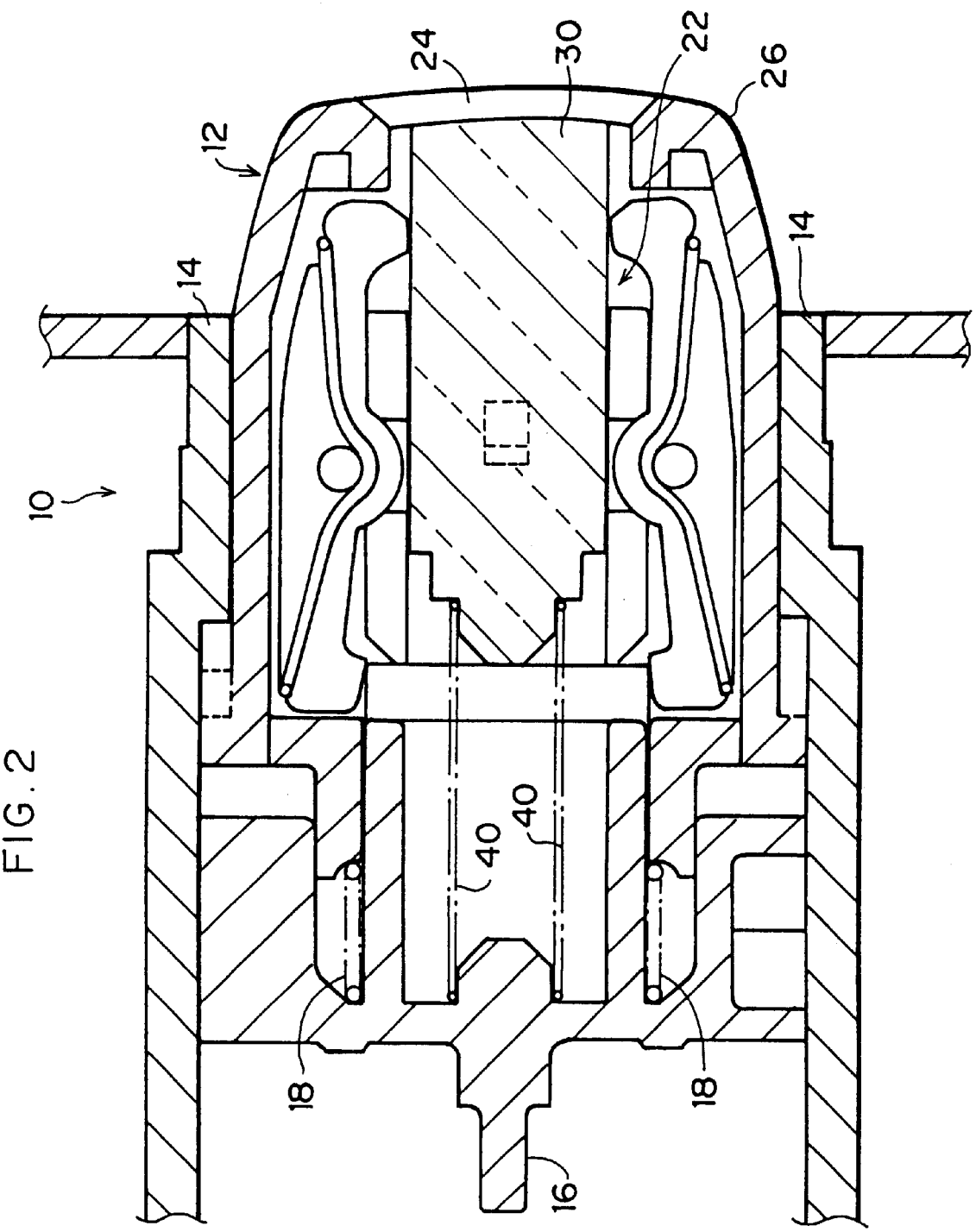
FIG. 2 is a cross-sectional view (taken along line 2—2 of FIG. 3) of a schematic structure of the key device for a vehicle.
Figure 3:
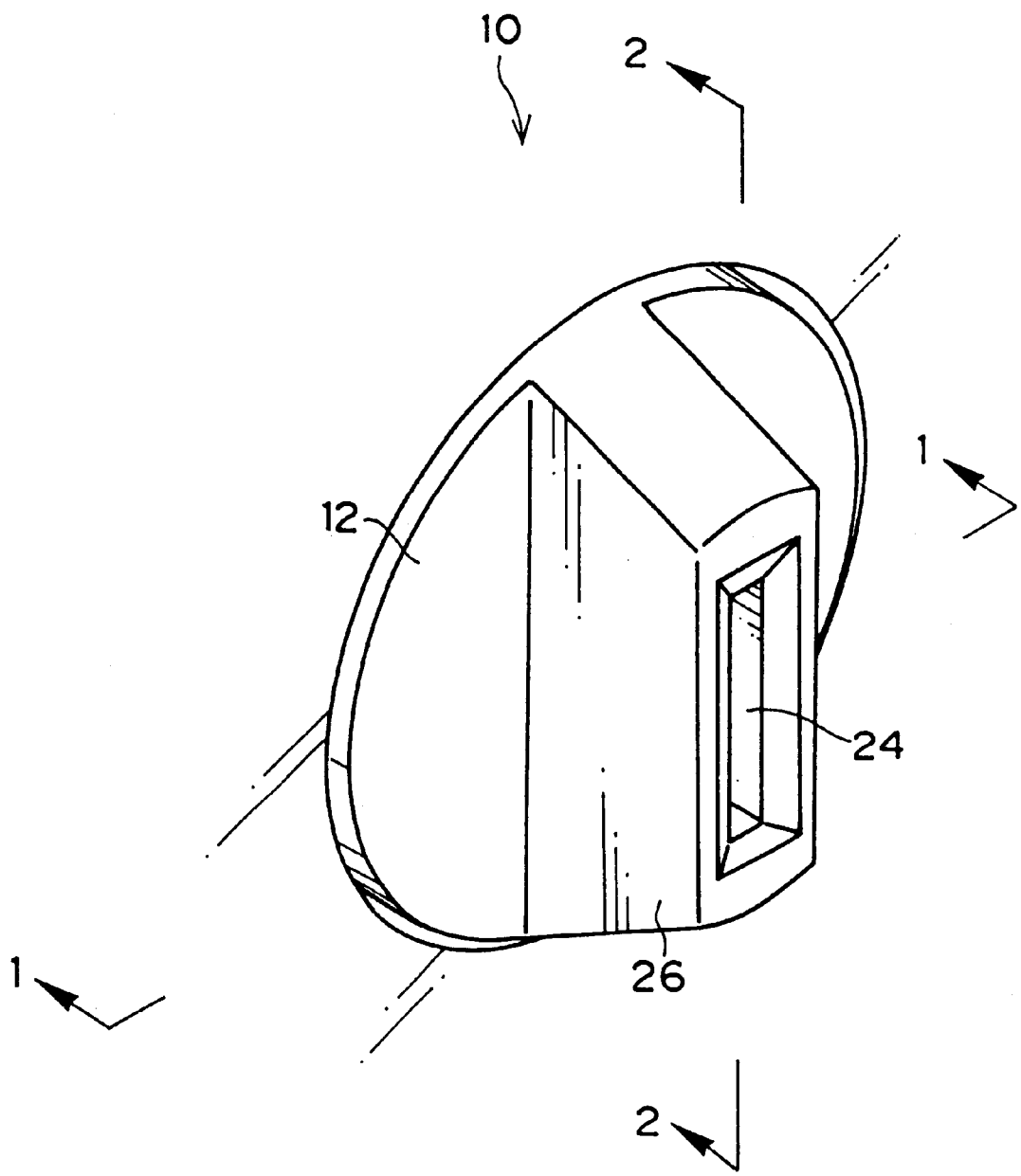
FIG. 3 is a perspective view of the key device for a vehicle to which the apparatus for insertion of a key therein of the present invention is applied.
Figure 4:
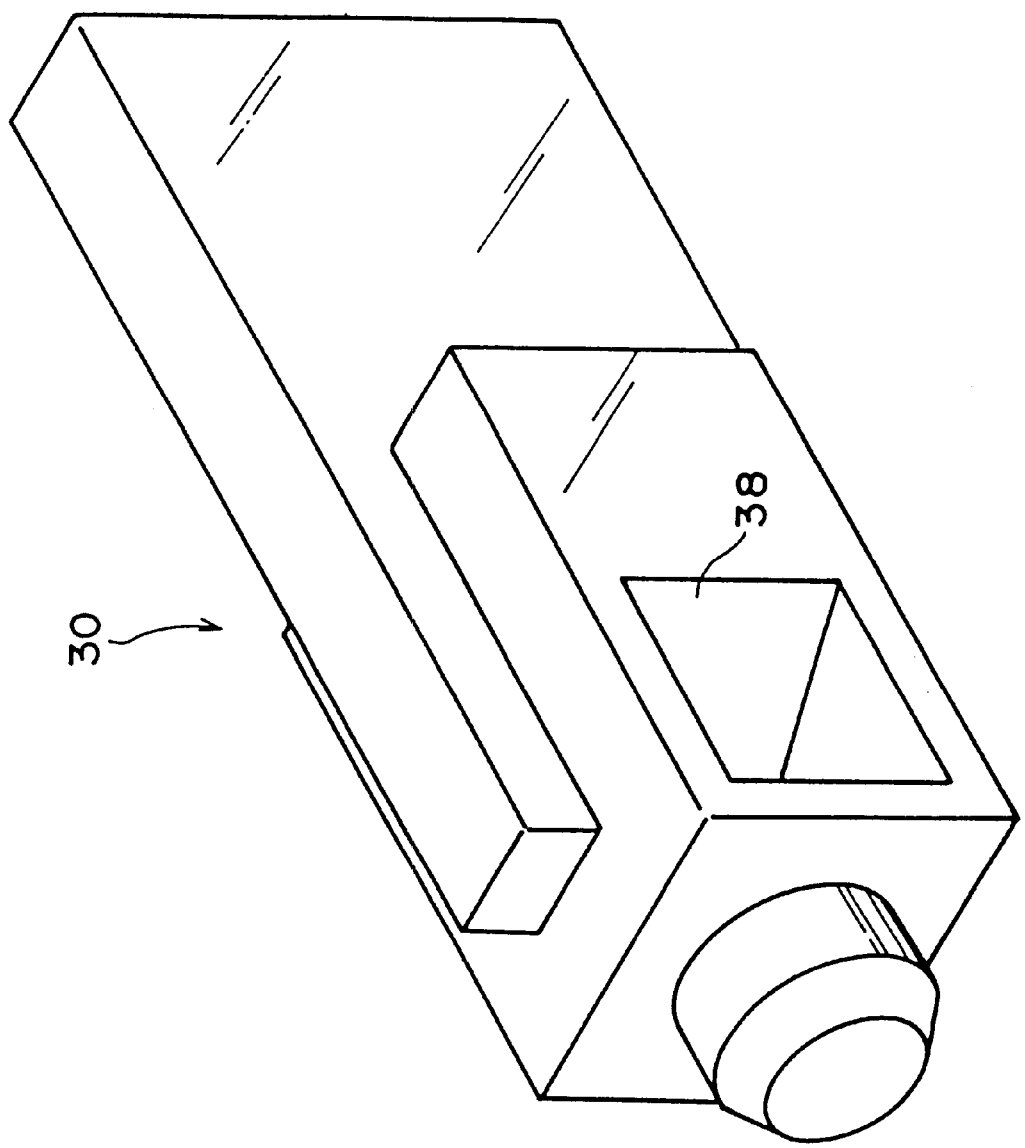
FIG. 4 is a perspective view illustrating a schematic structure of a shutter of the present invention.

The schematic structure of a key device 10 for a vehicle, to which an apparatus for insertion of a key therein relating to a preferred embodiment of the present invention is applied, is illustrated in crosssection in FIGS. 1 and 2. FIG. 3 is a perspective view illustrating the exterior of the key device 10 for a vehicle. FIG. 4 is a perspective view illustrating the schematic structure of main portions of the key device 10 for a vehicle.

The apparatus for insertion of a key therein relating to the embodiment of the present invention is provided with a knob 12. More specifically, the apparatus for insertion of a key therein includes a body portion 50 having the knob 12. The knob 12 is rotatably accommodated within a knob body 14, which is a part of the key device 10 for a vehicle, so as to be able to abut and push the knob body 14 as shown in FIG. 1. A rotor 16 is provided within the knob body 14. A coil spring 18 is provided between the rotor 16 and the knob 12. The coil spring 18 urges the knob 12 in a direction toward the exterior of the knob body 14. The knob body 14, the rotor 16, the coil spring 18 and the apparatus for insertion of a key therein of the present invention basically form the key device 10 for a vehicle.

A portion of the knob 12 protrudes from the knob body 14. A handle portion 26, which a vehicle occupant grasps, is formed at this protruding portion of the knob 12. An insertion hole 22 into which a key 28 (see FIGS. 5 and 6) can be inserted is formed in the knob 12 (that is, in the body portion 50). The insertion hole 22 opens at the distal end of the handle portion 26 at a opening 24.

In the present embodiment, an electronic key system, which verifies the key 28 by an electric signal of the key 28, is used. When the key 28 is inserted into the insertion hole 22 and is verified by the electric signal, the knob 12 can be operated. By a vehicle occupant grasping the handle portion 26 and turning the knob 12 while pushing the knob 12 in, the engine or the like of the vehicle can be started.

A shutter 30 is provided within the insertion hole 22. The shutter 30 is movable along the direction of insertion of the key 28. By the shutter 30 being positioned at the opening 24 side of the insertion hole 22, the insertion hole 22 is closed.

A compression coil spring 40 is provided between the shutter 30 and the rotor 16. The compression coil spring 40 which serves as a biasing member always urges (biases) the shutter 30 toward the opening 24 side of the insertion hole 22. As a result, when the key 28 is not inserted in the insertion hole 22, the shutter 30 is positioned at the opening 24 side of the insertion hole 22 due to the urging force of the compression coil spring 40, and the shutter 30 closes the insertion hole 22. Further, when the key 28 is inserted into the insertion hole 22, the shutter 30 is abutted and pressed by the key 28, and is moved into the insertion hole 22 against the urging force of the compression coil spring 40. Further, when the key 28 is removed from the insertion hole 22, the shutter 30 is moved toward the opening 24 side of the insertion hole 22 due to the urging force of the compression coil spring 40.

The shutter 30 is formed by a transparent member, and a reflective surface 38 is provided at the shutter 30. As a result, the shutter 30 also functions as a light guide.

A hollow portion 32 which communicates with the insertion hole 22 is formed in the knob 12. A hollow portion 34 which communicates with the hollow portion 32 is formed in the knob body 14 (the key device 10) of the vehicle. A light source 36 is provided at the outer side of the hollow portion 34 within the knob body 14. The insertion hole 22 can be illuminated through the hollow portions 32, 34 by the light source 36.

The reflective surface 38 is provided at a region of the shutter 30, which region opposes the light source 36 in a state in which the shutter 30 is positioned at the opening 24 side of the insertion hole 22. The angle of inclination of the reflective surface 38 is set to an angle which can reflect the light from the light source 36 toward the opening 24 of the insertion hole 22. Accordingly, in a state in which the key 28 is not inserted into the insertion hole 22, the light from the light source 36 is reflected toward the opening 24 of the insertion hole 22 by the reflective surface 38.

Figure 5:
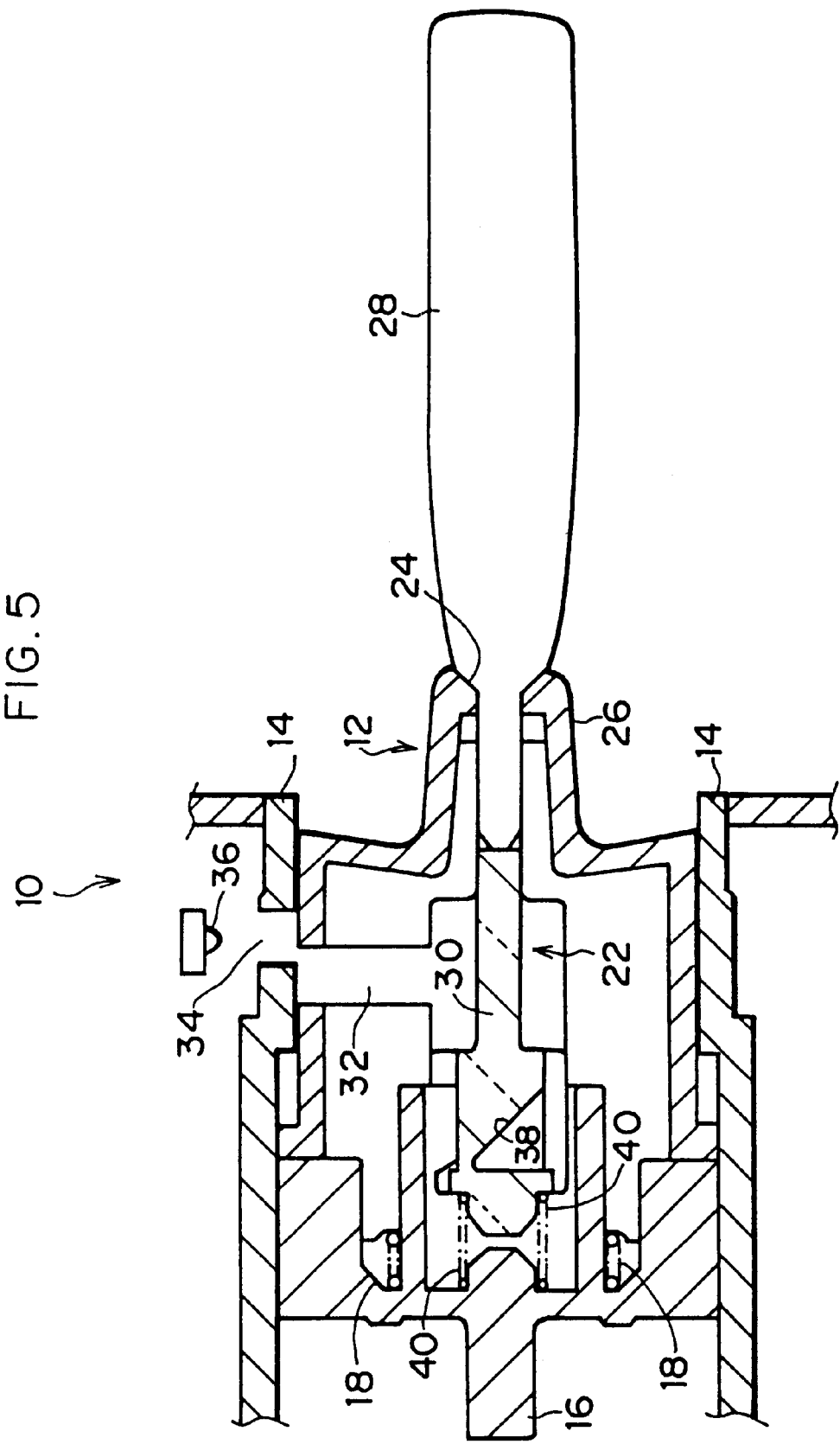
FIG. 5 is a cross-sectional view illustrating the schematic structure of the key device for a vehicle in a state in which a key is inserted into a key insertion hole and a knob is pressed.
Figure 6:
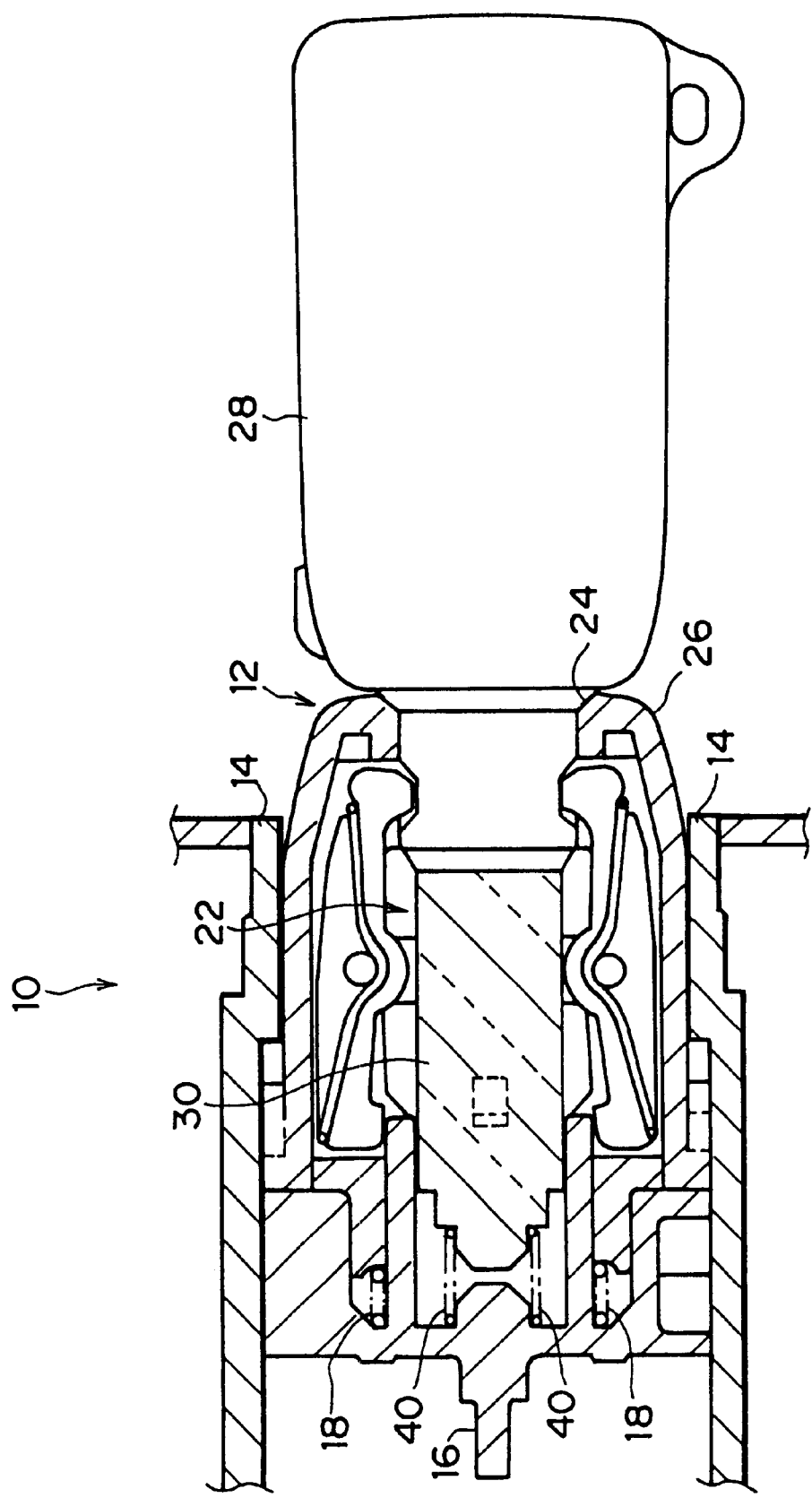
FIG. 6 is a cross-sectional view illustrating the schematic structure of the key device for a vehicle in a state in which the key is inserted into the key insertion hole and the knob is pressed.

FIGS. 5 and 6 are cross-sectional views illustrating the schematic structure of the key device 10 for a vehicle in a state in which the key 28 is inserted into the insertion hole 22 and the knob 12 is pressed.

In the state in which the key 28 is inserted into the insertion hole 22 and the knob 12 is pressed, as described above, the shutter 30 is moved into the insertion hole 22. As a result, the position of the reflective surface 38 of the shutter 30 shifts from the position opposing the light source 36. Accordingly, in this state, the reflective surface 38 does not reflect light from the light source 36 toward the opening 24 of the insertion hole 22.

Next, operation of the present embodiment will be described.

At the key device 10 for a vehicle having the above-described structure, in a state in which the key 28 is not inserted into the insertion hole 22, as illustrated in FIGS. 1 and 2, the shutter 30 is positioned at the opening 24 side of the insertion hole 22 due to the urging force of the compression coil spring 40, so as to close the insertion hole 22. As a result, in this state, foreign matter such as dust or the like can be substantially prevented from entering into the insertion hole 22.

Because the shutter 30 is positioned at the opening 24 side of the insertion hole 22, the position of the reflective surface 38 of the shutter 30 is a position opposing the light source 36. As a result, the reflective surface 38 reflects the light from the light source 36 toward the opening 24 of the insertion hole 22, and in this state, the opening 24 of the insertion hole 22 can be illuminated. Accordingly, even when the region around the opening 24 of the insertion hole 22 is dark (e.g., at night), the opening 24 of the insertion hole 22 can be recognized visually. Therefore, the key 28 can easily be inserted into the insertion hole 22. For the same reason, the direction of the knob 12 (the angle of inclination of the knob 12) can be recognized visually.

When the key 28 is inserted into the insertion hole 22, the shutter 30 is abutted and pushed by the key 28, and is moved into the insertion hole 22 against the urging force of the compression coil spring 40.

When the key 28 is inserted into the insertion hole 22 and the knob 12 is pushed, as illustrated in FIGS. 5 and 6, the shutter 30 is pushed by the key 28 against the urging force of the compression coil spring 40, and is moved into the insertion hole 22. As a result, the position of the reflective surface 38 of the shutter 30 shifts from the position opposing the light source 36, and the reflecting surface 38 of the shutter 30 does not reflect the light from the light source 36 toward the opening 24 of the insertion hole 22. As a result, in this state, the opening 24 of the insertion hole 22 is not illuminated.

When the key 28 is removed from the insertion hole 22, due to the urging force of the compression coil spring 40, the shutter 30 is moved toward the opening 24 side of the insertion hole 22. Therefore, even if foreign matter such as dust were to enter into the insertion hole 22 when the key 28 was being inserted into the insertion hole 22, the foreign matter could be discharged to the exterior of the insertion hole 22 by the shutter 30 when the key 28 was removed from the insertion hole 22.

In this way, in accordance with the present embodiment, foreign matter such as dust can be substantially prevented from entering into the insertion hole 22, and even in a case in which foreign matter does enter into the insertion hole 22, the foreign matter can be reliably discharged therefrom.

Further, even when the region surrounding the opening 24 of the insertion hole 22 is dark (such as at night), the key 28 can be easily inserted into the insertion hole 22. In addition, the direction of the knob 12 (the angle of inclination of the knob 12) can be visually confirmed.

In the present embodiment, the light source 36 is provided at the exterior of the hollow portion 34 within the knob body 14. However, even if the light source is provided at a different position (in a different type of vehicle, for example), the position and the angle of inclination of the reflective surface provided at the shutter can be set so as to correspond to the position at which the light source is set. Therefore, the range of applications of the present invention is extremely broad, and manufacturers have more degrees of freedom in designing the structure.

What is claimed is:

1. Apparatus for insertion of a key therein, the apparatus comprising:
   a body portion having an insertion hole defined therein for insertion of a key into said insertion hole, the insertion hole having an opening side;
   a shutter disposed so as to be movable within said insertion hole, along a direction of insertion of the key into said insertion hole, between a closing position, wherein said shutter is positioned proximate the opening side of said insertion hole, and an operation position, wherein said shutter has been pushed by the key and moved further into said insertion hole when the key has been inserted, said shutter substantially closing said insertion hole when at the closing position, wherein said shutter is formed by a transparent member for guiding light from a light source toward the opening side of said insertion hole; and
   a biasing member which biases said shutter toward the closing position.

2. The apparatus of claim 1, wherein said shutter includes a reflecting surface for reflecting light from the light source toward the opening side of said insertion hole.

3. The apparatus of claim 1, further comprising a light source, wherein the body portion has another hole defined therein, connecting to said insertion hole, wherein light from the light source is directed into said another hole.

4. The apparatus of claim 3, wherein said shutter is formed by a transparent member for guiding light from the light source toward the opening side of said insertion hole.

5. The apparatus of claim 1, wherein, if foreign matter has entered into said insertion hole when said shutter returns from the operation position to the closing position, the foreign matter is substantially discharged from said insertion hole by the movement of the shutter.

6. Apparatus for insertion of a key therein, the apparatus comprising:
   a body portion having an insertion hole defined therein for insertion of a key into said insertion hole, the insertion hole having an opening side;
   a shutter disposed within said insertion hole so as to be movable along a direction of insertion of the key into said insertion hole, said shutter closing said insertion hole when positioned proximate the opening side of said insertion hole; and
   biasing members for biasing said shutter toward the opening side of said insertion hole,
   wherein said shutter includes a transparent member having a reflecting surface disposed thereon for reflecting light from a light source toward the opening side of said insertion hole, when the shutter is positioned proximate the opening side of said insertion hole.

7. The apparatus of claim 6, wherein said shutter is movable between a closing position, at which said shutter is positioned proximate the opening side of said insertion hole and substantially closes said insertion hole, and an operation position, at which said shutter is pushed by the key and moved further into said insertion hole when the key is inserted.

8. The apparatus of claim 6, wherein said body portion has another hole defined therein, connecting to said insertion hole, for providing light to the reflecting surface.

9. The apparatus of claim 6, wherein when the shutter is proximate the opening side of said insertion hole, said shutter substantially prevents foreign matter from entering into said insertion hole.

10. The apparatus of claim 6, wherein when said shutter returns to a position proximate the opening side of said insertion hole, if foreign matter has entered into sad insertion hole, said foreign matter is substantially discharged from said insertion hole.

11. Apparatus for insertion of a key therein, the apparatus comprising:
   (a) a body portion having first and second holes defined therein and connecting to one another, the first hole having an entrance for inserting a key into the hole, the second hole being for providing light to the entrance of the first hole;
   (b) a shutter slidably mounted in the first hole, the shutter being slidable from a position proximate the entrance, to another position further in the first hole;
   (c) a resilient member disposed in the first hole, resiliently urging the shutter toward the entrance of the first hole; and
   (d) a light source disposed in the second hole for providing light.

12. The apparatus of claim 11, wherein the shutter includes a transparent member for transmitting light therethrough from the second hole to the entrance of the first hole.

13. The apparatus of claim 12, wherein the shutter includes a reflector disposed on the transparent member for reflecting light from the second hole toward the entrance of the first hole.

14. The apparatus of claim 13, wherein the first and second holes are defined in directions transverse to one another.

15. The apparatus of claim 12, wherein the shutter includes a transparent member for transmitting light therethrough from the light source to the entrance of the first hole.

16. The apparatus of claim 15, wherein the shutter has a reflector connected to the transparent member for reflecting light from the light source toward the entrance of the first hole.

17. The apparatus of claim 16, wherein the reflector is disposed along an axial direction of the second hole, when the shutter is proximate the entrance of the first hole.

18. The apparatus of claim 15, wherein when the shutter is proximate the entrance of the first hole, the reflector opposes the light source and reflects light from the light source toward the entrance of the first hole.

* * * * *